United States Patent
Chen

(10) Patent No.: US 7,388,987 B2
(45) Date of Patent: Jun. 17, 2008

(54) COMPUTING DISSIMILARITY MEASURES

(75) Inventor: Mei Chen, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 713 days.

(21) Appl. No.: 10/857,561

(22) Filed: May 28, 2004

(65) Prior Publication Data

US 2005/0276484 A1    Dec. 15, 2005

(51) Int. Cl.
*G06K 9/46* (2006.01)
(52) U.S. Cl. .................. 382/195; 382/205; 382/279
(58) Field of Classification Search ................ 345/615; 359/306; 382/195, 205, 279, 308; 708/4, 708/315, 420–422, 813, 814
See application file for complete search history.

(56) References Cited

U.S. PATENT DOCUMENTS

| 5,255,354 | A | 10/1993 | Mahoney |
| 6,453,074 | B1 * | 9/2002 | Zheng ........................ 382/260 |
| 6,674,915 | B1 * | 1/2004 | Wang ......................... 382/263 |
| 6,970,597 | B1 * | 11/2005 | Olding et al. ............... 382/167 |
| 2002/0110272 | A1 | 8/2002 | Brodsky |
| 2002/0186309 | A1 * | 12/2002 | Keshet et al. ............... 348/272 |

OTHER PUBLICATIONS

Problem Set 2, Stereo Matching Cost Computation [online], published prior to midnight Sep. 19, 2003. [retrieved on Aug. 1, 2007]. Retrieved from the Internet:<URL:http://www.cc.gatech.edu/classes/AY2004/cs4495_fall/ProblemSets/PS2-track1.htm>.*
Birchfield et al., "A Pixel Dissimilarity Measure that is Insensitive to Image Sampling," IEEE Transactions on Pattern Analysis and Machine Intelligence, vol. 20, No. 4, pp. 401-406, Apr. 1998.
Puzicha et al., "Empirical Evaluation of Dissimilarity Measures for Color and Texture,"Proceedings of the IEEE International Conference on Computer Vision, pp. 1165-1173, IEEE, 1999.

* cited by examiner

*Primary Examiner*—Matthew C. Bella
*Assistant Examiner*—G. F. Cunningham

(57) ABSTRACT

Methods, machines, and machine-readable media for computing dissimilarity measures are described. In one aspect, a first set of pixel neighborhood values (PNVs) is computed from respective sets of pixel values of a first image corresponding to different spatially-shifted pixel neighborhoods each encompassing a mutual target pixel in the first image. A second set of PNVs is computed from respective sets of pixel values of a second image corresponding to different spatially-shifted pixel neighborhoods each encompassing a mutual target pixel in the second image. A measure of dissimilarity is computed based at least in part on the first and second sets of computed PNVs. The computed dissimilarity measure is stored on a machine-readable medium.

57 Claims, 4 Drawing Sheets

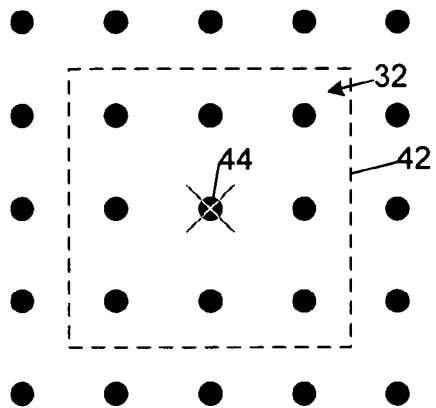
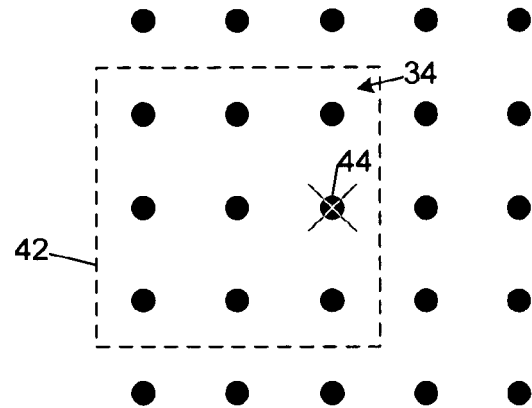
FIG. 3A
FIG. 3B
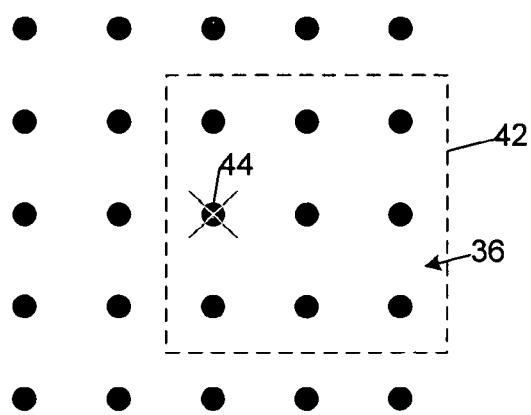
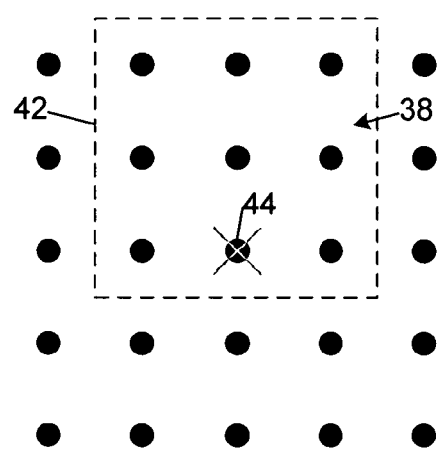
FIG. 3C
FIG. 3D

COMPUTING DISSIMILARITY MEASURES

BACKGROUND

Measures of dissimilarity are used in a wide variety of image processing applications. Dissimilarity measures are relied upon in a variety of computer vision tasks, including image matching, image classification, image segmentation, and image retrieval. For example, measures of image dissimilarity have been incorporated in motion estimation algorithms and algorithms for matching corresponding pixels in a pair of stereoscopic images.

In general, a dissimilarity measure quantifies the degree to which two objects differ from one another. Typically, a dissimilarity measure is computed from features (or parameters) that describe the objects. With respect to image objects (or simply "images"), corresponding pixels in different images (e.g., a pair of stereoscopic images or successive video frames) of the same scene typically have different values. Many factors, such as sensor gain, bias, noise, depth discontinuities, and sampling, contribute to the dissimilarity between corresponding pixel values in different images of the same scene.

A variety of pixel dissimilarity measures have been proposed. Some of such pixel dissimilarity measures are insensitive to gain, bias, noise, and depth discontinuities. One one-dimensional pixel dissimilarity measure that has been proposed is insensitive to image sampling. This pixel dissimilarity measure uses the linearly interpolated intensity functions surrounding pixels in the left and right images of a stereoscopic pair. In particular, this approach measures how well the intensity of a pixel in the left image of the stereoscopic pair fits into the linearly interpolated region surrounding a pixel along the epipolar line in the right image of the stereoscopic pair. Similarly, this approach also measures how well the intensity of the pixel in the right image fits into the linearly interpolated region surrounding the respective pixel in the left image. The dissimilarity between the pixels is defined as the minimum of the two measurements.

SUMMARY

The invention features methods, machines, and machine-readable media for computing dissimilarity measures.

In one aspect of the invention, a first set of pixel neighborhood values (PNVs) is computed from respective sets of pixel values of a first image corresponding to different spatially-shifted pixel neighborhoods each encompassing a mutual target pixel in the first image. A second set of PNVs is computed from respective sets of pixel values of a second image corresponding to different spatially-shifted pixel neighborhoods each encompassing a mutual target pixel in the second image. A measure of dissimilarity is computed based at least in part on the first and second sets of computed PNVs. The computed dissimilarity measure is stored on a machine-readable medium.

Other features and advantages of the invention will become apparent from the following description, including the drawings and the claims.

DESCRIPTION OF DRAWINGS

FIGS. 3A-3E are diagrammatic views of different pixel neighborhoods each of which encompasses a mutual target pixel in an image.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The image processing embodiments described in detail below incorporate multidimensional dissimilarity measures that are computed based on pixel neighborhoods. These dissimilarity measures preserve local smoothness information and, thereby, reduce noise and sampling artifacts that otherwise would be present in a pixel-wise dissimilarity measurement approach. In this way, these embodiments described herein achieve a more precise and robust measurement of dissimilarity that is useful for comparative image analysis in two or more dimensions.

Figure 1:
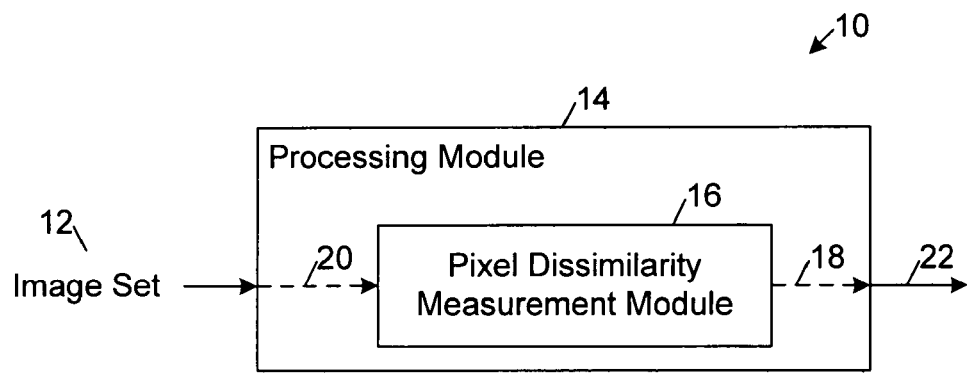
FIG. 1 is a block diagram of a processing module of an image processing system that includes an embodiment of a pixel dissimilarity measurement module that is configured to compute dissimilarity measures from an image set.

FIG. 1 shows an embodiment of a system 10 for processing a set of images 12 that includes a processing module 14 that incorporates a pixel dissimilarity measurement module 16. The pixel dissimilarity measurement module 16 computes dissimilarity measures 18 from input values 20 that are obtained from the image set 12. The input values may correspond to pixel values of images in the set 12 or they may correspond to values that are derived from pixel values of images in the set 12. The processing module 14 produces an output 22 that at least in part relies on the dissimilarity measures 18 that are computed by the pixel dissimilarity measurement module 16. For example, in some implementations, the processing module 14 computes motion vector estimates between pairs of images based at least in part on the dissimilarity measures 18. In other exemplary implementations, the processing module 14 computes dissimilarity-measure-based parameter values that are used in one or more computer vision algorithms, such as image classification, image segmentation, and image retrieval.

In general, the modules of system 10 are not limited to any particular hardware or software configuration, but rather they may be implemented in any computing or processing environment, including in digital electronic circuitry or in computer hardware, firmware, device driver, or software. For example, in some implementations, these modules may be embedded in the hardware of any one of a wide variety of digital and analog electronic devices, including desktop and workstation computers, digital still image cameras, digital video cameras, printers, scanners, and portable electronic devices (e.g., mobile phones, laptop and notebook computers, and personal digital assistants).

The image set 12 may correspond to an original image set that was captured by an image sensor (e.g., a video image sequence or a still image sequence) or a processed version of such an original image set. For example, the image set 12 may consist of a sampling of the images selected from an original image set that was captured by an image sensor or a compressed, reduced-resolution version or enhanced-resolution version of an original image set that was captured by an image sensor.

Figure 2:
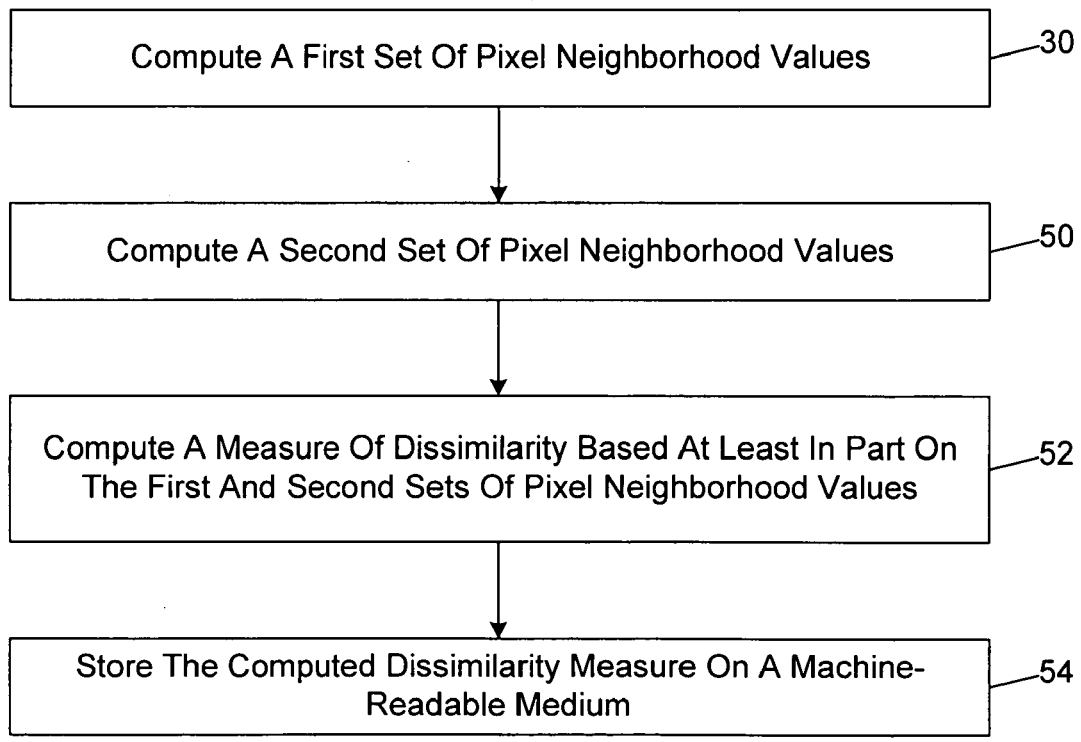
FIG. 2 is a flow diagram of an embodiment of a method of computing dissimilarity measures.
Figure 3E:
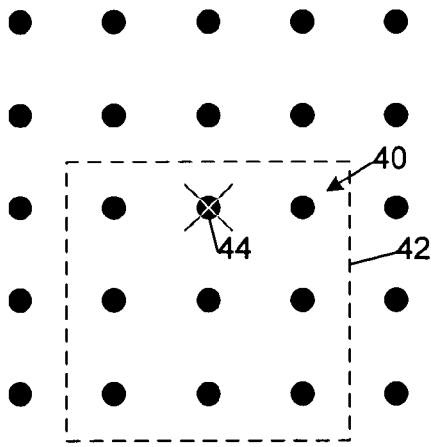

FIG. 2 shows an embodiment of a method by which pixel dissimilarity measurement module 16 computes dissimilarity measures 18. In accordance with this embodiment, pixel dissimilarity measurement module 16 computes a first set of pixel neighborhood values (PNVs) from respective sets of pixel values of a first image (block 30). Each set of pixel values corresponds to different spatially-shifted pixel neighborhoods, each of which encompasses a mutual target pixel in the first image. In general, a pixel neighborhood includes a set of adjacent pixels selected from an image in the image set 12.

In some implementations, each pixel neighborhood consists of a k×k pixel area of an image in set 12, where k has an integer value greater than 1. For example, referring to FIGS. 3A-3E, in one exemplary implementation, each pixel neighborhood 32, 34, 36, 38, 40 corresponds to a respective 3×3 pixel area within a spatially-shifted window 42 that encompasses a target pixel 44 (marked with an "X"). The pixel neighborhood 32 is spatially symmetric about the target pixel 44, and each of the other pixel neighborhoods is spatially shifted by one pixel in a respective direction in the plane of the image. In particular, pixel neighborhood 34 is spatially shifted one pixel to the left of pixel neighborhood 32; pixel neighborhood 36 is spatially shifted one pixel to the right of pixel neighborhood 32; pixel neighborhood 38 is spatially shifted one pixel up relative to pixel neighborhood 32; and pixel neighborhood 40 is spatially shifted one pixel down relative to pixel neighborhood 32.

The number of pixel neighborhoods used to compute respective PNVs is predetermined. In some implementations, the number of pixel neighborhoods is the number of neighborhoods that achieves a symmetric sampling of pixels around the target pixel. For example, the five pixel neighborhoods 32-30 shown in FIGS. 3A-3E are needed to achieve a symmetric sampling of pixels around the target pixel 44. The number of pixel neighborhoods, the size of the window 42, and the directions in which the window 42 is shifted may be varied to obtain different sets of pixel neighborhoods that are used to compute respective PNVs. For example, in one exemplary implementation, the window 42 may be shifted along the diagonal directions of window 42, instead of the left, right, up, and down directions shown in FIGS. 3A-3E. In other exemplary implementations, each pixel neighborhood consists of a 5×5 pixel area within a spatially shifted window that encompasses the target pixel. In one implementation of this type, five pixel neighborhoods are used to compute PNVs. The five pixel neighborhoods may correspond to a central pixel neighborhood that is symmetric about the target pixel and four pixel neighborhoods that are shifted by either one or two pixels in each of the left, right, up, and down directions. In another implementation of this type, nine pixel neighborhoods are used to compute PNVs. The nine pixel neighborhoods may correspond to a central pixel neighborhood that is symmetric about the target pixel and eight pixel neighborhoods that are shifted by one and two pixels in each of the left, right, up, and down directions.

Figure 4:
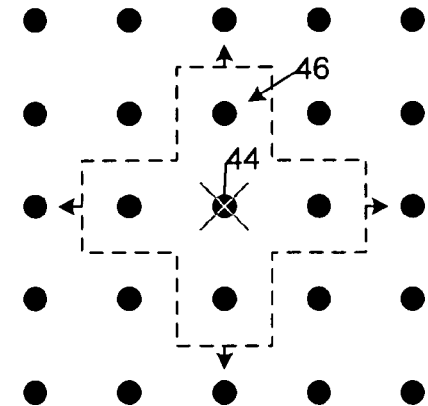
FIG. 4 is a diagrammatic view of an exemplary cross-shaped pixel neighborhood of a target pixel in an image.

FIG. 4 shows an exemplary cross-shaped neighborhood 46. A set of five pixel neighborhoods that may be used to compute PNVs may consist of the neighborhood 46 and the four neighborhoods that are obtained by spatially shifting the neighborhood 46 one pixel in each of the left, right, up, and down directions indicated by the arrows shown in FIG. 4.

In some embodiments, each $PNV_{N(u,v)}$ is computed by a function, $f(\ )$, of the pixel values $p_{ij}$ (e.g., the luminance values) in the corresponding pixel neighborhood $N(u,v)$. That is:

$$PNV_{N(u,v)} = f(\{p_{ij}\}_{\forall i,j \in N(u,v)}) \quad (1)$$

The values of u and v index the numbers of pixels the neighborhood $N(u,v)$ is shifted along left-right and up-down axes relative to a reference neighborhood $N(0,0)$, which may be the pixel neighborhood that is symmetric about the target pixel. In some exemplary implementations, each $PNV_{N(u,v)}$ is computed by summing pixel values $p_{ij}$ in the corresponding pixel neighborhood $N(u,v)$:

$$PNV_{N(u,v)} = \sum_{i,j \in N(u,v)} p_{ij} \quad (2)$$

In other implementations, each $PNV_{N(u,v)}$ is computed by applying an operator (F) to pixel values $p_{ij}$ in the corresponding pixel neighborhood $N(u,v)$:

$$PNV_{N(u,v)} = F \otimes \{p_{ij}\}_{\forall i,j \in N(u,v)} \quad (3)$$

The operator may correspond to a wide variety of different filtering operators, including a box filter, an average filter, a median filter, and a Gaussian filter.

Referring back to FIG. 2, after the first set of PNVs is computed, the pixel dissimilarity measurement module 16 computes a second set of PNVs from respective sets of pixel values of a second image (block 50). Each set of pixel values corresponds to different spatially-shifted pixel neighborhoods, each of which encompasses a mutual target pixel in the second image. The PNVs are computed in the same way that the PNVs of the first set are computed.

The pixel dissimilarity measurement module 16 computes a measure of dissimilarity based at least in part on the first and second sets of computed PNVs (block 52) and stores the computed dissimilarity measure on a machine-readable medium (block 54).

Figure 5:
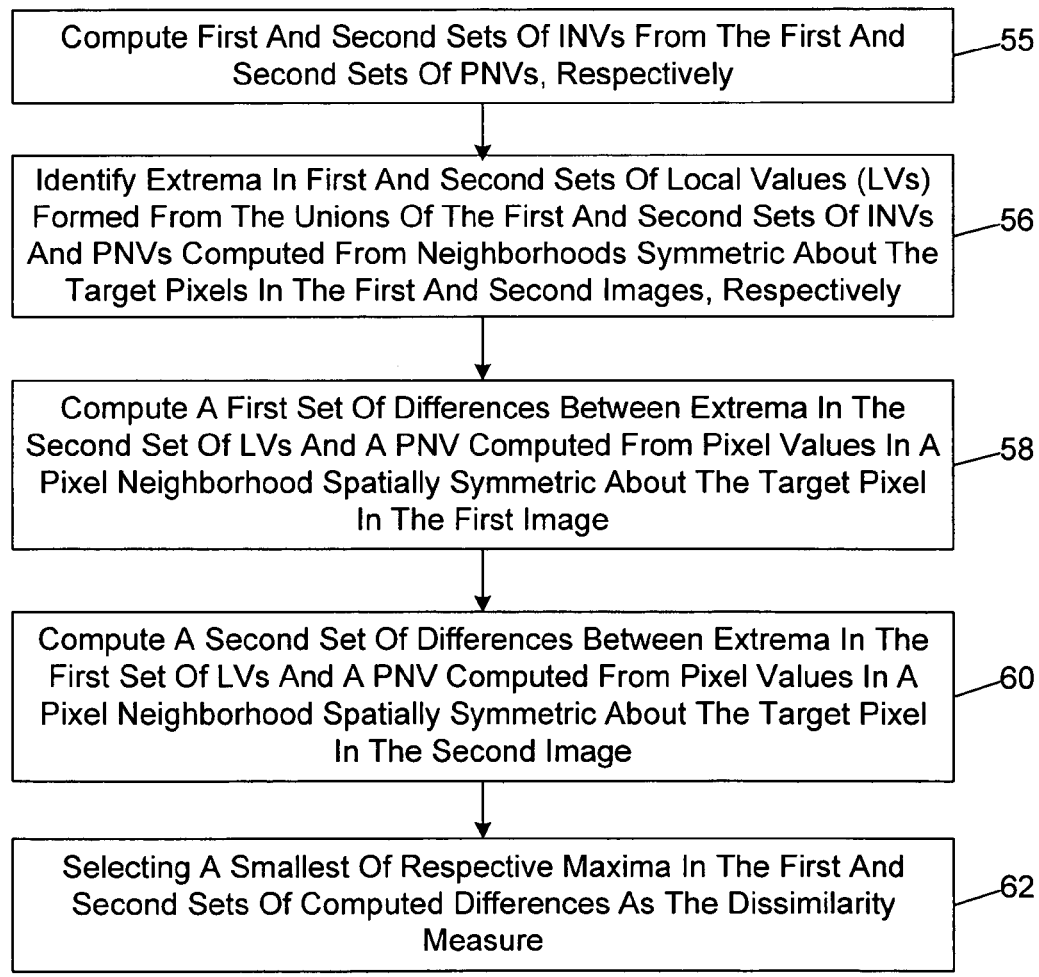
FIG. 5 is a flow diagram of an implementation of the dissimilarity measure computation method shown in FIG. 2.

FIG. 5 shows an exemplary implementation of a method by which pixel dissimilarity measurement module 16 computes a measure of dissimilarity based at least in part on the first and second sets of computed PNVs.

The pixel dissimilarity measurement module 16 computes first and second sets of interpolated neighborhood values (INVs) from the first and second sets of PNVs, respectively (block 55). In general, the INVs may be computed using any type of linear or nonlinear interpolation or curve fitting technique. In one exemplary implementation, the INVs in a given set are computed by linearly interpolating between the PNV computed from a given neighborhood that is symmetric about the target pixel and each of the PNVs computed from pixel values in neighborhoods that are spatially shifted relative to the given neighborhood.

Figure 6:
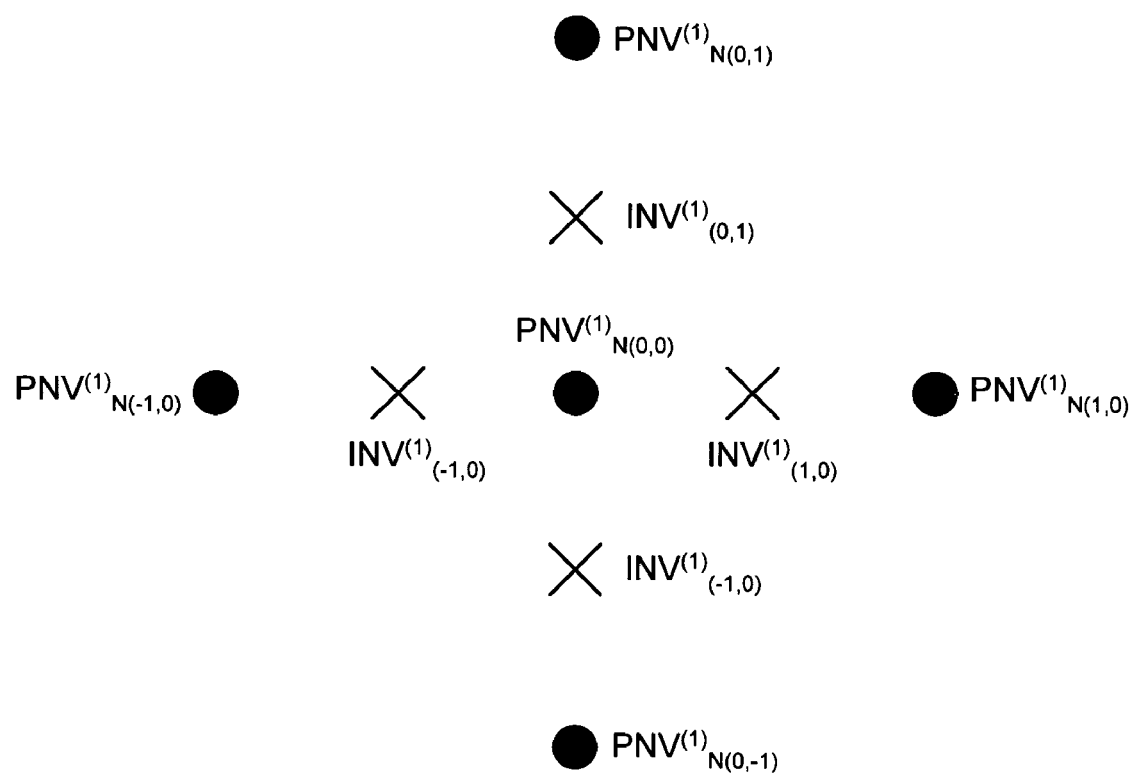
FIG. 6 is a diagrammatic view of a set of pixel neighborhood values (PNVs) and a set of interpolated neighborhood values (INVs) derived from the set of PNVs.

For example, in the implementation shown in FIGS. 3A-3E, the following sets of PNVs are computed in blocks 30 and 50 of FIG. 2: $\{PNV^{(1)}_{N(0,0)}, PNV^{(1)}_{N(-1,0)}, PNV^{(1)}_{N(1,0)}, PNV^{(1)}_{N(0,-1)}, PNV^{(1)}_{N(0,1)}\}$ and $\{PNV^{(2)}_{N(0,0)}, PNV^{(2)}_{N(-1,0)}, PNV^{(2)}_{N(0,-1)}, PNV^{(2)}_{N(0,1)}\}$, where the superscript (1) refers to the first image and the superscript (2) refers to the second image. In one exemplary implementation, the INVs are computed by linear interpolation at spatial positions half-way between the centroids of the pixel value neighborhoods used to compute the PNVs. In particular, with reference to FIG. 6, the INVs in the first image are computed by:

$$INV^{(1)}_{(u,v)} = \frac{1}{2}(PNV^{(1)}_{N(0,0)} + PNV^{(1)}_{N(u,v)}) \quad (4)$$

Similarly, the INVs in the second image are computed by:

$$INV^{(2)}_{(u,v)} = \frac{1}{2}(PNV^{(2)}_{N(0,0)} + PNV^{(2)}_{N(u,v)}) \quad (5)$$

The unions of the first and second sets of INVs and the PNVs computed from neighborhoods that are symmetric about the target pixels in the first and second images respectively form first and second sets of local values ($LV^{(1)}$, $LV^{(2)}$). That is, $$LV^{(1)}_{(u,v)} \in \{PNV^{(1)}_{N(0,0)}, INV^{(1)}_{(u,v)}\} \forall u,v \quad (6)$$

$$LV^{(2)}_{(u,v)} \in \{PNV^{(2)}_{N(0,0)}, INV^{(2)}_{(u,v)}\} \forall u,v \quad (7)$$

The pixel dissimilarity measurement module 16 identifies extrema in the first and second sets of LVs (block 56). In some implementations, the extrema correspond to minima and maxima in respective subsets of the computed LVs aligned along different respective axes corresponding to the directions in which the pixel neighborhoods are shifted relative to the central pixel neighborhood that is symmetric with respect to the target pixel.

For example, in the implementation shown in FIGS. 3A-3E, the following sets of LVs are computed: $\{PNV^{(1)}_{N(0,0)}, INV^{(1)}_{(-1,0)}, INV^{(1)}_{(1,0)}, INV^{(1)}_{(0,-1)}, INV^{(1)}_{(0,1)}\}$ and $\{PNV^{(2)}_{N(0,0)}, INV^{(2)}_{(-1,0)}, INV^{(2)}_{(1,0)}, INV^{(2)}_{(0,1)}, INV^{(2)}_{(0,1)}\}$, where (1) refers to the first image and the superscript (2) refers to the second image. In block 56, the pixel dissimilarity measurement module 16 identifies extrema in subsets of the computed LVs corresponding to different shift direction axes. In the exemplary implementation of FIGS. 3A-3E, the subsets of LVs for the first and second images along the left-right axis are: $\{PNV^{(1)}_{N(0,0)}, INV^{(1)}_{(-1,0)}, INV^{(1)}_{(1,0)}\}$ and $\{PNV^{(2)}_{N(0,0)}, INV^{(2)}_{(-1,0)}, INV^{(2)}_{(1,0)}\}$. The LVs for the first and second images along the up-down axis are: $\{PNV^{(1)}_{N(0,0)}, INV^{(1)}_{(0,-1)}, INV^{(1)}_{(0,1)}\}$ and $\{PNV^{(2)}_{N(0,0)}, IN\ INV^{(2)}_{(0,1)}\}$. The left-right extrema ($X_{MIN}$, $X_{MAX}$) and the up-down extrema ($Y_{MIN}$, $Y_{MAX}$) for the first and second images (1) and (2) are defined as follows:

$$X^{(1)}_{MIN} = \min\{PNV^{(1)}_{N(0,0)}, INV^{(1)}_{(-1,0)}, INV^{(1)}_{(1,0)}\} \quad (8)$$

$$X^{(1)}_{MAX} = \max\{PNV^{(1)}_{N(0,0)}, INV^{(1)}_{(-1,0)}, INV^{(1)}_{(1,0)}\} \quad (9)$$

$$Y^{(1)}_{MIN} = \min\{PNV^{(1)}_{N(0,0)}, INV^{(1)}_{(0,-1)}, INV^{(1)}_{(0,1)}\} \quad (10)$$

$$Y^{(1)}_{MIN} = \max\{PNV^{(1)}_{N(0,0)}, INV^{(1)}_{(0,-1)}, INV^{(1)}_{(0,1)}\} \quad (11)$$

$$X^{(2)}_{MIN} = \min\{PNV^{(2)}_{N(0,0)}, INV^{(2)}_{(-1,0)}, INV^{(2)}_{(1,0)}\} \quad (12)$$

$$X^{(2)}_{MAX} = \max\{PNV^{(2)}_{N(0,0)}, INV^{(2)}_{(-1,0)}, INV^{(2)}_{(1,0)}\} \quad (13)$$

$$Y^{(2)}_{MIN} = \min\{PNV^{(2)}_{N(0,0)}, INV^{(2)}_{(0,-1)}, INV^{(2)}_{(0,1)}\} \quad (14)$$

$$Y^{(2)}_{MIN} = \max\{PNV^{(2)}_{N(0,0)}, INV^{(2)}_{(0,-1)}, INV^{(2)}_{(0,1)}\} \quad (15)$$

The pixel dissimilarity measurement module 16 computes a first set of differences between extrema in the second set of LVs and a PNV computed from pixel values in a pixel neighborhood spatially symmetric about the target pixel in the first image (block 58). A respective set of differences is computed for each of the axes corresponding to the shift directions. In the exemplary implementation of FIGS. 3A-3E, the first set of differences for the left-right axis is $\{PNV^{(1)}_{N(0,0)} - X^{(2)}_{MAX}, X^{(2)}_{MIN} - PNV^{(1)}_{N(0,0)}\}$ and the first set of differences for the up $\{PNV^{(1)}_{N(0,0)} - Y^{(2)}_{MAX}, Y^{(2)}_{MIN} - PNV^{(1)}_{N(0,0)}\}$.

The pixel dissimilarity measurement module 16 computes a second set of differences between extrema in the first set of LVs and a PNV computed from pixel values in a pixel neighborhood spatially symmetric about the target pixel in the second image (block 60). In the exemplary implementation of FIGS. 3A-3E, the second set of differences for the left-right axis is $\{PNV^{(2)}_{N(0,0)} - X^{(1)}_{MAX}, X^{(1)}_{MIN} - PNV^{(2)}_{N(0,0)}\}$ and the second set of differences for the up-down axis is $\{PNV^{(2)}_{N(0,0)} - Y^{(1)}_{MAX}, Y^{(1)}_{MIN} - PNV^{(2)}_{N(0,0)}\}$.

The pixel dissimilarity measurement module 16 selects a smallest of respective maxima in the first and second sets of computed differences as the dissimilarity measure (block 62). This selection process is performed for each axis. In the exemplary implementation of FIGS. 3A-3E, the maxima $\overline{\Delta}^{(1-2)}_x$ and $\overline{\Delta}^{(2-1)}_x$ for the left-right axis are defined as follows:

$$\overline{\Delta}^{(1-2)}_x = \max\{0, PNV^{(1)}_{N(0,0)} - X^{(2)}_{MAX}, X^{(2)}_{MIN} - PNV^{(1)}_{N(0,0)}\}$$

$$\overline{\Delta}^{(2)}_x = \max\{0, PNV^{(2)}_{N(0,0)} - X^{(1)}_{MAX}, X^{(1)}_{MIN} - PNV^{(2)}_{N(0,0)}\}$$

The smallest of these maxima is selected by the pixel dissimilarity measurement module 16 as the left-right dissimilarity measure $\Delta_x$. That is, $$\Delta_x = \min\{\overline{\Delta}^{(1-2)}_x, \overline{\Delta}^{(2-1)}_x\} \quad (18)$$

Similarly, the maxima $\overline{\Delta}^{(1-2)}_y$ and $\overline{\Delta}^{(2-1)}_y$ for the up-down axis are defined as follows:

$$\overline{\Delta}^{(2)}_y = \max\{0, PNV^{(1)}_{N(0,0)} - X^{(2)}_{MAX}, X^{(2)}_{MIN} - PNV^{(1)}_{N(0,0)}\}$$

$$\overline{\Delta}^{(2-1)}_y = \max\{0, PNV^{(2)}_{N(0,0)} - X^{(1)}_{MAX}, X^{(1)}_{MIN} - PNV^{(2)}_{N(0,0)}\}$$

The smallest of these maxima is selected by the pixel dissimilarity measurement module 16 as the up-down dissimilarity measure $\Delta_Y$. That is, $$\Delta_y = \min\{\overline{\Delta}^{(1-2)}_y, \overline{\Delta}^{(2-1)}_y\} \quad (21)$$

In some implementations of system 10, the resulting multidimensional dissimilarity measures $\Delta_x$, $\Delta_y$ are used to represent dissimilarity between the target pixel in the first image and the target pixel in the second image. In other implementations of system 10, the multidimensional dissimilarity measures $\Delta_x$, $\Delta_y$ are used to represent dissimilarity between a pixel neighborhood centered about the target pixel in the first image and a pixel neighborhood centered about the target pixel in the second image.

The embodiments described in detail above readily may be extended to more than two dimensions. For example, dissimilarity measures may be computed for images parameterized in three dimensions (e.g., images with three spatial coordinate axes, or images with two spatial coordinate axes and one temporal coordinate axis) as follows. In this approach, additional extrema terms (e.g., $Z_{MIN}$, $Z_{MAX}$ or $t_{MIN}$, $t_{MAX}$) are added for pixel neighborhoods shifted along the third dimension (e.g., the vertical, Z, axis, or the time, t, axis), and a respective dissimilarity measure is computed for each axis. For example, the maxima $\overline{\Delta}^{(1-2)}_z$ and $\overline{\Delta}^{(2-1)}_z$ for the vertical axis, Z, are defined as follows:

$$\overline{\Delta}^{(1-2)}_z = \max\{0, PNV^{(1)}_{N(0,0,0)} - Z^{(2)}_{MAX}, Z^{(2)}_{MIN} - PNV^{(1)}_{N(0,0,0)}\}$$

$$\overline{\Delta}^{(2-1)}_z = \max\{0, PNV^{(2)}_{N(0,0,0)} - Z^{(1)}_{MAX}, Z^{(1)}_{MIN} - PNV^{(2)}_{N(0,0,0)}\}$$

where $PNV^{(1)}_{N(0,0,0)}$ is the pixel neighborhood value computed for the neighborhood $N(X,Y,Z)=N(0,0,0)$ that is symmetric about the target pixel in the first image, and $PNV^{(2)}_{N(0,0,0)}$ is the pixel neighborhood value computed for the neighborhood $N(0,0,0)$ that is symmetric about the target pixel in the second image. The smallest of these maxima is selected by the pixel dissimilarity measurement module 16 as the vertical dissimilarity measure $\Delta_z$. That is, $$\Delta_z = \min\{\overline{\Delta}^{(1-2)}_z, \overline{\Delta}^{(2-1)}_z\} \quad (24)$$

This approach may be extended to any number of additional parameter dimensions in an analogous way.

Other embodiments are within the scope of the claims.

The systems and methods described herein are not limited to any particular hardware or software configuration, but rather they may be implemented in any computing or processing environment, including in digital electronic circuitry or in computer hardware, firmware, or software. In general, the systems may be implemented, in part, in a computer process product tangibly embodied in a machine-readable storage device for execution by a computer processor. In some embodiments, these systems preferably are implemented in a high level procedural or object oriented processing language; however, the algorithms may be implemented in assembly or machine language, if desired. In any case, the processing language may be a compiled or interpreted language. The methods described herein may be performed by a computer processor executing instructions organized, for example, into process modules to carry out these methods by operating on input data and generating output. Suitable processors include, for example, both general and special purpose microprocessors. Generally, a processor receives instructions and data from a read-only memory and/or a random access memory. Storage devices suitable for tangibly embodying computer process instructions include all forms of non-volatile memory, including, for example, semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially designed ASICs (application-specific integrated circuits).

What is claimed is:

1. A machine-implemented image processing method, comprising:
    computing a first set of pixel neighborhood values (PNVs) from respective sets of pixel values of a first image corresponding to different spatially-shifted pixel neighborhoods each encompassing a mutual target pixel in the first image;
    computing a second set of PNVs from respective sets of pixel values of a second image corresponding to different spatially-shifted pixel neighborhoods each encompassing a mutual target pixel in the second image;
    computing a measure of dissimilarity based at least in part on the first and second sets of computed PNVs; and
    storing the computed dissimilarity measure on a machine-readable medium.

2. The method of claim 1, wherein the dissimilarity measure represents dissimilarity between the target pixel in the first image and the target pixel in the second image.

3. The method of claim 1, wherein the dissimilarity measure represents dissimilarity between a pixel neighborhood in the first image and a pixel neighborhood in the second image.

4. The method of claim 1, wherein the dissimilarity measure is computed for a given coordinate axis based at least in part on first and second sets of PNVs computed from respective sets of pixel values corresponding to different respective pixel neighborhoods spatially-shifted along the given coordinate axis in the first and second images.

5. The method of claim 4, further comprising computing a respective dissimilarity measure for each of multiple orthogonal coordinate axes.

6. The method of claim 5, wherein a respective dissimilarity measure is computed for each of first and second coordinate axes defined with respect to each of the first and second images.

7. The method of claim 6, wherein a respective dissimilarity measure is computed for at least one additional coordinate axis orthogonal to the first and second coordinate axes.

8. The method of claim 1, wherein each neighborhood consists of a respective set of adjacent pixels in one of the first and second images.

9. The method of claim 1, wherein each pixel neighborhood is symmetric in at least two dimensions.

10. The method of claim 1, wherein each pixel neighborhood is a 3×3 pixel array.

11. The method of claim 1, wherein each PNV is computed by summing pixel values in the corresponding pixel neighborhood.

12. The method of claim 1, wherein each PNV is computed by applying an operator to pixel values in the corresponding pixel neighborhood.

13. The method of claim 1, further comprising computing first and second sets of interpolated neighborhood values (INVs) from the first and second sets of PNVs, respectively.

14. The method of claim 13, wherein the first set of INVs and a PNV computed from pixel values in a pixel neighborhood symmetric about the target pixel in the first image form a first set of local values, and the second set of INVs and a PNV computed from pixel values in a pixel neighborhood symmetric about the target pixel in the second image form a second set of local values.

15. The method of claim 14, wherein the dissimilarity measure is computed based at least in part on a difference between a local value selected from the first set and a local value selected from the second set.

16. The method of claim 14, wherein the dissimilarity measure is computed based at least in part on extrema in the first and second sets of local values.

17. The method of claim 16, wherein computing the dissimilarity measure comprises computing a first set of differences between extrema in the second set of local values and a PNV computed from pixel values in a pixel neighborhood spatially symmetric about the target pixel in the first image.

18. The method of claim 17, wherein computing the dissimilarity measure further comprises computing a second set of differences between extrema in the first set of local values and a PNV computed from pixel values in a pixel neighborhood spatially symmetric about the target pixel in the second image.

19. The method of claim 18, wherein the computed dissimilarity measure corresponds to a smallest of respective maxima in the first and second sets of computed differences.

20. An image processing machine, comprising at least one data processing module operable to:
    compute a first set of pixel neighborhood values (PNVs) from respective sets of pixel values of a first image corresponding to different spatially-shifted pixel neighborhoods each encompassing a mutual target pixel in the first image;
    compute a second set of PNVs from respective sets of pixel values of a second image corresponding to different spatially-shifted pixel neighborhoods each encompassing a mutual target pixel in the second image;

compute a measure of dissimilarity based at least in part on the first and second sets of computed PNVs; and store the computed dissimilarity measure on a machine-readable medium.

21. The machine of claim 20, wherein the dissimilarity measure represents dissimilarity between the target pixel in the first image and the target pixel in the second image.

22. The machine of claim 20, wherein the dissimilarity measure represents dissimilarity between a pixel neighborhood in the first image and a pixel neighborhood in the second image.

23. The machine of claim 20, wherein at least one data processing module is operable to compute the dissimilarity measure for a given coordinate axis based at least in part on first and second sets of PNVs computed from respective sets of pixel values corresponding to different respective pixel neighborhoods spatially-shifted along the given coordinate axis in the first and second images.

24. The machine of claim 23, wherein at least one data processing module is operable to compute a respective dissimilarity measure for each of multiple orthogonal coordinate axes.

25. The machine of claim 24, wherein at least one data processing module is operable to compute a respective dissimilarity measure for each of first and second coordinate axes defined with respect to each of the first and second images.

26. The machine of claim 25, wherein at least one data processing module is operable to compute a respective dissimilarity measure for at least one additional coordinate axis orthogonal to the first and second coordinate axes.

27. The machine of claim 20, wherein each neighborhood consists of a respective set of adjacent pixels in one of the first and second images.

28. The machine of claim 20, wherein each pixel neighborhood is symmetric in at least two dimensions.

29. The machine of claim 20, wherein each pixel neighborhood is a 3×3 pixel array.

30. The machine of claim 20, wherein at least one data processing module is operable to compute each PNV by summing pixel values in the corresponding pixel neighborhood.

31. The machine of claim 20, wherein at least one data processing module is operable to compute each PNV by applying an operator to pixel values in the corresponding pixel neighborhood.

32. The machine of claim 20, wherein at least one data processing module is operable to compute first and second sets of interpolated neighborhood values (INVs) from the first and second sets of PNVs, respectively.

33. The machine of claim 32, wherein the first set of INVs and a PNV computed from pixel values in a pixel neighborhood symmetric about the target pixel in the first image form a first set of local values, and the second set of INVs and a PNV computed from pixel values in a pixel neighborhood symmetric about the target pixel in the second image form a second set of local values.

34. The machine of claim 33, wherein at least one data processing module is operable to compute the dissimilarity measure based at least in part on a difference between a local value selected from the first set and a local value selected from the second set.

35. The machine of claim 33, wherein at least one data processing module is operable to compute the dissimilarity measure based at least in part on extrema in the first and second sets of local values.

36. The machine of claim 35, wherein at least one data processing module is operable to compute a first set of differences between extrema in the second set of local values and a PNV computed from pixel values in a pixel neighborhood spatially symmetric about the target pixel in the first image.

37. The machine of claim 36, wherein at least one data processing module is operable to compute a second set of differences between extrema in the first set of local values and a PNV computed from pixel values in a pixel neighborhood spatially symmetric about the target pixel in the second image.

38. The machine of claim 37, wherein the computed dissimilarity measure corresponds to a smallest of respective maxima in the first and second sets of computed differences.

39. A machine-readable medium storing machine-readable instructions for causing a machine to:

compute a first set of pixel neighborhood values (PNVs) from respective sets of pixel values of a first image corresponding to different spatially-shifted pixel neighborhoods each encompassing a mutual target pixel in the first image;

compute a second set of PNVs from respective sets of pixel values of a second image corresponding to different spatially-shifted pixel neighborhoods each encompassing a mutual target pixel in the second image;

compute a measure of dissimilarity based at least in part on the first and second sets of computed PNVs; and store the computed dissimilarity measure on a machine-readable medium.

40. The machine-readable medium of claim 39, wherein the dissimilarity measure represents dissimilarity between the target pixel in the first image and the target pixel in the second image.

41. The machine-readable medium of claim 39, wherein the dissimilarity measure represents dissimilarity between a pixel neighborhood in the first image and a pixel neighborhood in the second image.

42. The machine-readable medium of claim 39, wherein the machine-readable instructions cause the machine to compute dissimilarity measure for a given coordinate axis based at least in part on first and second sets of PNVs computed from respective sets of pixel values corresponding to different respective pixel neighborhoods spatially-shifted along the given coordinate axis in the first and second images.

43. The machine-readable medium of claim 42, wherein the machine-readable instructions cause the machine to compute a respective dissimilarity measure for each of multiple orthogonal coordinate axes.

44. The machine-readable medium of claim 43, wherein the machine-readable instructions cause the machine to compute a respective dissimilarity measure for each of first and second coordinate axes defined with respect to each of the first and second images.

45. The machine-readable medium of claim 44, wherein the machine-readable instructions cause the machine to compute a respective dissimilarity measure for at least one additional coordinate axis orthogonal to the first and second coordinate axes.

46. The machine-readable medium of claim 39, wherein each neighborhood consists of a respective set of adjacent pixels in one of the first and second images.

47. The machine-readable medium of claim 39, wherein each pixel neighborhood is symmetric in at least two dimensions.

48. The machine-readable medium of claim 39, wherein each pixel neighborhood is a 3×3 pixel array.

49. The machine-readable medium of claim 39, wherein the machine-readable instructions cause the machine to compute each PNV by summing pixel values in the corresponding pixel neighborhood.

50. The machine-readable medium of claim 39, wherein the machine-readable instructions cause the machine to compute each PNV by applying an operator to pixel values in the corresponding pixel neighborhood.

51. The machine-readable medium of claim 39, wherein the machine-readable instructions cause the machine to compute first and second sets of interpolated neighborhood values (INVs) from the first and second sets of PNVs, respectively.

52. The machine-readable medium of claim 51, wherein the first set of INVs and a PNV computed from pixel values in a pixel neighborhood symmetric about the target pixel in the first image form a first set of local values, and the second set of INVs and a PNV computed from pixel values in a pixel neighborhood symmetric about the target pixel in the second image form a second set of local values.

53. The machine-readable medium of claim 52, wherein the machine-readable instructions cause the machine to compute the dissimilarity measure based at least in part on a difference between a local value selected from the first set and a local value selected from the second set.

54. The machine-readable medium of claim 52, wherein the machine-readable instructions cause the machine to compute the dissimilarity measure based at least in part on extrema in the first and second sets of local values.

55. The machine-readable medium of claim 54, wherein the machine-readable instructions cause the machine to compute a first set of differences between extrema in the second set of local values and a PNV computed from pixel values in a pixel neighborhood spatially symmetric about the target pixel in the first image.

56. The machine-readable medium of claim 55, wherein the machine-readable instructions cause the machine to compute a second set of differences between extrema in the first set of local values and a PNV computed from pixel values in a pixel neighborhood spatially symmetric about the target pixel in the second image.

57. The machine-readable medium of claim 56, wherein the computed dissimilarity measure corresponds to a smallest of respective maxima in the first and second sets of computed differences.

* * * * *

UNITED STATES PATENT AND TRADEMARK OFFICE
CERTIFICATE OF CORRECTION

PATENT NO. : 7,388,987 B2  
APPLICATION NO. : 10/857561  
DATED : June 17, 2008  
INVENTOR(S) : Mei Chen It is certified that error appears in the above-identified patent and that said Letters Patent is hereby corrected as shown below:

In column 4, line 63, delete "$PNV^{(2)}_{N(-1,0)} PNV^{(2)}_{N(0,-1)}$" and insert -- $PNV^{(2)}_{N(-1,0)}$, $PNV^{(2)}_{N(1,0)}$, $PNV^{(2)}_{N(0,-1)}$ --, therefor.

In column 5, line 29, before "and" delete "$INV^{1)}_{(0,1)}\}$" and insert -- $INV^{(1)}_{(0,1)}\}$ --, therefor.

In column 5, line 30, delete "$INV^{(2)}_{(0,1)}$," and insert -- $INV^{(2)}_{(0,-1)}$, --, therefor.

In column 5, line 30, after "where" insert -- the superscript --.

In column 5, line 40, after "$\{PNV^{(2)}_{N(0,0)}$," delete "IN" and insert -- $INV^{(2)}_{(0,-1)}$, --, therefor.

In column 5, line 65, delete "$\{PNV^{(1)}_{N(0,0)}-X^{(2)}_{MAX}$," and insert -- $\{PNV^{(1)}_{N(0,0)}-X^{(2)}_{MAX}$, --, therefor.

In column 5, line 67, delete "up" and insert -- up-down axis is --, therefor.

In column 6, line 15, delete " $\overline{\Delta}^{(1-2)}_{x}$ " and insert -- $\overline{\Delta}^{(1-2)}_{x}$ --, therefor.

In column 6, lines 16-17, after "$PNV^{(1)}_{N(0,0)}\}$" insert -- (16) --.

In column 6, line 18, delete " $\overline{\Delta}^{(2)}_{x}$ " and insert -- $\overline{\Delta}^{(2-1)}_{x}$ --, therefor.

In column 6, lines 18-19, delete "$X^{(1)}_{MIN}-PNV_{(2)N(0,0)}\}$" and insert -- $X^{(1)}_{MIN}-PNV^{(2)}_{N(0,0)}\}$ --, therefor.

In column 6, lines 18-19, after "$X^{(1)}_{MIN}-PNV_{(2)N(0,0)}\}$" insert -- (17) --.

In column 6, line 28, delete " $\overline{\Delta}^{(2)}_{y}$ " and insert -- $\overline{\Delta}^{(1-2)}_{Y}$ --, therefor.

In column 6, lines 28-29, after "$PNV^{(1)}_{N(0,0)}\}$" insert -- (19) --.

In column 6, lines 31-32, after "$PNV^{(2)}_{N(0,0)}\}$" insert -- (20) --.

In column 6, lines 59-60, after "$PNV^{(1)}_{N(0,0,0)}\}$" insert -- (22) --.

In column 6, lines 61-62, after "$PNV^{(2)}_{N(0,0,0)}\}$" insert -- (23) --.

Signed and Sealed this

Twenty-third Day of March, 2010

David J. Kappos
*Director of the United States Patent and Trademark Office*